United States Patent
Yeung et al.

(10) Patent No.: US 7,913,291 B2
(45) Date of Patent: Mar. 22, 2011

(54) MEANS AND METHOD FOR CONTROL OF PERSONAL DATA

(75) Inventors: Peter Yeung, Kista (SE); Henrik Sandstrom, Enskede (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 906 days.

(21) Appl. No.: 11/721,857

(22) PCT Filed: Dec. 22, 2004

(86) PCT No.: PCT/SE2004/001988

§ 371 (c)(1), (2), (4) Date: Jun. 15, 2007

(87) PCT Pub. No.: WO2006/068551

PCT Pub. Date: Jun. 29, 2006

(65) Prior Publication Data

US 2008/0141337 A1    Jun. 12, 2008

(51) Int. Cl.
*G06F 17/00* (2006.01)
*H04K 1/00* (2006.01)

(52) U.S. Cl. .................. 726/1; 726/4; 726/28; 709/218; 709/219; 709/224

(58) Field of Classification Search .................. None
See application file for complete search history.

(56) References Cited

U.S. PATENT DOCUMENTS

| 6,148,342 A * | 11/2000 | Ho ................................. 709/225 |
| 7,093,246 B2 * | 8/2006 | Brown et al. .................. 717/173 |
| 7,225,460 B2 * | 5/2007 | Barzilai et al. ..................... 726/1 |
| 2002/0104015 A1 | 8/2002 | Barzilai et al. |
| 2003/0081621 A1 | 5/2003 | Godfrey et al. |

FOREIGN PATENT DOCUMENTS

| EP | 1 307 019 A1 | 5/2003 |
| JP | 2004-365440 A | 12/2004 |
| WO | WO 03/032222 A1 | 4/2003 |
| WO | WO 2004/072885 A2 | 1/2004 |
| WO | WO 2004/047398 A1 | 6/2004 |

* cited by examiner

*Primary Examiner* — Nasser Moazzami
*Assistant Examiner* — Fikremariam Yalew

(57) ABSTRACT

In the setting of policies for personal data, instructions originating from a primary user and defining a privacy policy for a selected piece of personal data are communicated, via an application unit (220), to a privacy-setting node (258) of a service broker (250). The instruction define possible data providers (240) for the data. The policy is stored at a database (254) in a privacy tree for the primary user comprising hierarchically arranged personal data with associated policies. Upon receiving a request for the personal data, the privacy-setting node determines whether there is a privacy policy defined from the data by checking the privacy tree of the primary user. If there is a policy for a requested data, it selects a data provider among the possible data providers and returns a response to the application unit, providing access to the requested personal data at this provider.

26 Claims, 5 Drawing Sheets

MEANS AND METHOD FOR CONTROL OF PERSONAL DATA

TECHNICAL FIELD

The present invention generally relates to security in communication systems and in particular to end user controlled handling of personal data on the Internet and similar networks.

BACKGROUND

The development of services for the Mobile Internet has grown explosively during the last years and lead to an abundance of services and applications, such as games, calendars, chat groups, news, and e-commerce. In particular, there is a high need for personalized services, i.e. services dependent on personal data, for example providing a requesting person with the weather at his current location, time tables for commuting to/from his work, e-commerce deliveries to his home, charges to his credit cards, etc.

In order to be able to offer personalized services, information about the individual (position, demographics, biometrics, etc.) must be provided somehow and this makes privacy measures crucial. Privacy polices are increasingly important to make personalization work and thereby take full advantage of Mobile Internet promises.

Previous communication systems in general require that a policy is reviewed and accepted for every new service that is of interest to the user. Each policy is different and associated with different implications on the need for or release of personal data. However, services and applications will come and go at a very high pace on the Internet as well as the Mobile Internet, especially for the consumer segment. This high application turnover affects personal privacy issues, since it is not practically feasible that users shall review and accept companies' policies for every new service that could be of interest. For common policy types, it takes a user at least 10 minutes to fully read and understand one single policy and the obstacle to end users is evident.

Therefore, a system that in user-friendly ways safeguards personal information without making it unnecessarily complicated to obtain personalized services is highly desirable. A network enabling these features is outlined in our International Patent Application [1], hereafter referred to as "the classic Lock Box", which suggests to make the release of personal data disconnected from its use. A general architecture is provided, designed to be able to block (and release) personal information, such as demographical information or physical location, without having to be re-configured every time there is a new service making use of a particular piece of data. The conditions for releasing and blocking personal data are under control of the end user. A web service implementation of the above general network is disclosed in our International Patent Application [2].

Although the classic Lock Box provides a general mechanism and network for handling personal data on e.g. the Internet, there are still issues to be solved in connection therewith. Very large quantities of personal data will be involved and many actors will want to perform different actions with the data, which complicates the system and the problem of how to appropriately store and structure the access rights to such data remains. There is also a need for a solution by means of which the personal data can be set as well as handed out in a user-friendly manner.

SUMMARY

An object of the present invention is to provide an improved handling of personal data in open networks like the Internet, in particular in connection with a service broker system. Another object is to provide a mechanism for storing personal data in an efficient manner without compromising the security of the end users. Still another object is to achieve user-friendly handling of requests related to personal data.

These objects are achieved in accordance with the attached claims.

The present invention relates to the kind of communication systems outlined through the classic Lock Box, which has been provided with new advantageous functionality to provide even more user-friendly and efficient handling of personal data. The proposed procedure for end user controlled handling of personal data is based on a particular data arrangement in privacy trees containing personal data elements with respective privacy policies. There are both a generic privacy tree and a number of individual privacy trees and the privacy trees are hierarchically arranged such that personal data and privacy policies can be conveniently accessed e.g. through interactions with particular look-up tables and pointers. In accordance with particular embodiments of the invention, new concepts of primary and secondary end users as well as daemon nodes are introduced to further enhance the system performance as well as the experience of the end user. The daemon node allows for aggregated requests of multiple data from (possibly) different levels and/or different sub-trees of the privacy tree. In a preferred embodiment the features of generic and individual privacy trees, primary and secondary users, and daemon nodes act together to form a procedure capable of convenient handling of large quantities of personal privacy data.

According to other aspects of the invention a communication node and a communication system with means for end user controlled handling of personal data are provided.

BRIEF DESCRIPTION OF THE DRAWINGS

The invention, together with further objects and advantages thereof, is best understood by reference to the following description and the accompanying drawings, in which.

DETAILED DESCRIPTION

The present invention relates to systems presenting an architecture where the release of personal data is disconnected from its use in a similar manner as in "the classic Lock Box" [1]. Therefore, a brief description of the classic Lock Box now follows, whereafter the features of the invention will be explained in detail.

Figure 1:
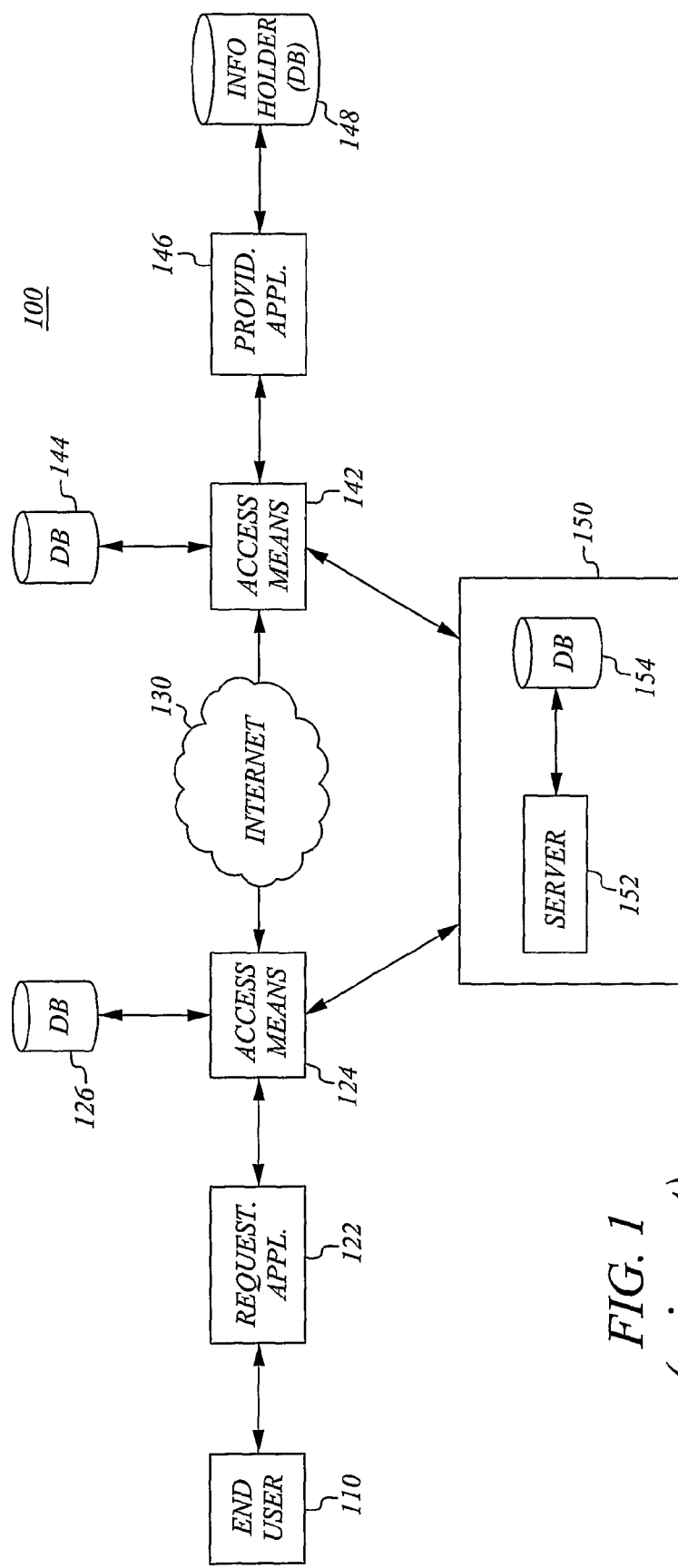
FIG. 1 is a schematic view of a prior art communication system for end user control of personal data in which the present invention can be used.

An implementation of the classic Lock Box is shown in FIG. 1, which is a schematic view of a prior art communication system for end user control of personal data in which the present invention can be used. The illustrated system 100 includes a requesting application 122 with access means 124, an information providing application 146 with access means 142, central server means 150 comprising a central server 152 and an associated database (DB) 154, and an information holding database 148. Each access means 124, 142 also has a respective database 126, 144. The access means are arranged to communicate with the central server means, which handles information routing and personal profile locking/unlocking using personal protection profiles stored in the database 154.

Upon being contacted by an end user 110, the requesting application 122 typically sends a request for personal profile data located anywhere in the network to the access means 124 for the purpose of either fetching data or setting new data in the personal profile. The access means 124 invokes its database 126 to find out the address of the central server means 150 to which the request should be forwarded. Via secure HTTP (HTTPS), the request is forwarded to the central server 152 which retrieves an appropriate policy from the personal protection profiles in database 154. An indication of rejection or grant is returned to access means 124, which in case of grant uses HTTPS for communication with access means 142 over the Internet 130. Access means 142 contacts the providing application 146, which retrieves the data from the information holding database 148. The information is returned to the requesting application via access means 142, over the Internet 130 and access means 124.

A main feature of the classic Lock Box system 100 is that access rights to personal information are administered by the end user 110 at a central location (the central server means 150), whereas the personal data, i.e. the information as such, is distributed throughout the communication system on different sources 148. The end user is thus provided with a central facility where he can lock/unlock, i.e. customize access to, personal information from different providers and to different information requesters.

Moreover, by means of the classic Lock Box the identities of the requesting side can be concealed for the providing side and vice versa. There is no connection between personal information from different locations without going through the user controlled central server means 150. By spreading out the personal profile data at different locations (or at the same location but unrelated) with different user identities, a high degree of end user privacy can be obtained.

A further development and particular application of the classic Lock Box in connection with web services can be found in [2], which describes another prior art communication system for end user control of personal data in which the present invention can be used.

For further details on the Lock Box concept, reference is made to [1] and [2].

The present invention relates to the kind of communication systems outlined through the classic Lock Box but has developed the concept further. As mentioned in the background section, generally very large quantities of personal data will be involved and many actors will want to perform different actions with the data, which complicates the system. The classic Lock Box system has therefore been provided with new advantageous functionality to provide an even more user-friendly and efficient handling of personal data.

Basically, the problems of cumbersome storing and handling of privacy policy data are according to the present invention overcome by a mechanism based on data arrangement in privacy trees having properties that allow them to be conveniently accessed e.g. through interactions with particular look-up tables and pointers. There are both a generic privacy tree and a number of individual privacy trees and the system preferably also relies on the new concepts of primary and secondary end users as well as daemon nodes to further enhance the system performance as well as the experience of the end user. In preferred embodiments these features act together and are complementary to each other in a way that will be described in the following. Before the features of generic and individual privacy trees, primary and secondary users, and daemon nodes are exemplified and described in detail, the main functional elements of a typical communication system according to the present invention will be described with reference to FIG. 2.

Figure 2:
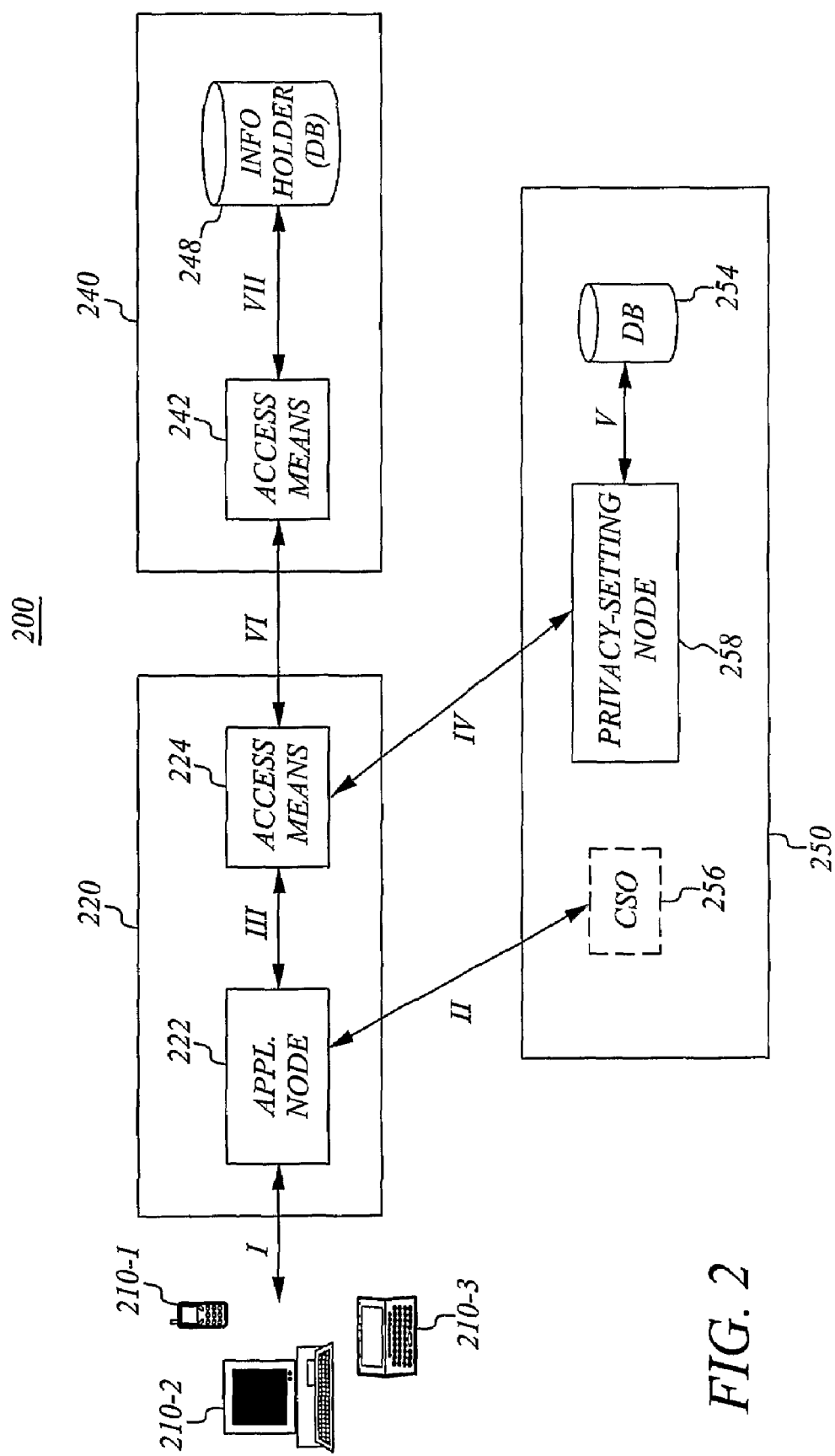
FIG. 2 is a schematic view of a communication system for end user control of personal data in accordance with an example embodiment of the present invention.

FIG. 2 is a schematic view of a communication system for end user control of personal data in accordance with an example embodiment of the present invention. A communication system 200 comprising an application unit 220, a data providing unit 240 and a service broker 250 is shown. End users communicating with the application unit 220 are in the figure represented by a cellular phone 210-1, a personal computer (PC) 210-2 and a laptop 210-3. The cellular phone 210-1 typically uses an intermediate device, such as a Wireless Application Protocol (WAP) gateway, to contact the application unit. The application unit 220 comprises an application node 222 and an access means 224. The access means 224 can communicate with access means 242 of the data providing unit 240 in order to get (or set) personal data, e.g. biometrics or position data, contained in information holding means 248, such as a database (DB).

Both the application unit 220 and the data providing unit 240 has means for communicating with the service broker 250, which comprises a privacy-setting node (PSN) 258 with at least one associated database 254. The database 254 contains privacy policies hierarchically arranged in privacy trees. The PSN 258 plays an important role in executing instructions from the user related to the policies in the privacy trees. It can be viewed as a manager functionality in the service broker 250 that comprises means for setting privacy policies in the privacy trees of the database 254 as well as means for handing out of privacy policies to requesting parties 220. Both the data setting and the request handling involves checks performed by the PSN 258 regarding whether the actions are allowed or not, whereby particular identities issued by and restricted to the service broker 250 are useful. Details on the PSN functionality will be provided in the below sections "Example procedure for setting data" and "Example procedure for request handling", respectively.

In the illustrated embodiment of FIG. 2, the service broker 250 also includes a common sign-on (CSO) server 256, the (optional) functionality of which will be described in the section "Common sign-on implementation".

It should be noted that a communication system in accordance with the invention typically comprises many application units and many data providing units. The personal data is then distributed throughout the system at databases of the different data providers.

Privacy Trees

The present invention proposes to store privacy policies and related data in (or in association with) the privacy-setting node by means of privacy trees. The trees contain nodes representing the data elements, for which personal preferences may be set in privacy policies. The nodes with personal data elements are hierarchically arranged such that a user-friendly tree structure easy to grasp as well as to manage is achieved.

Figure 3:
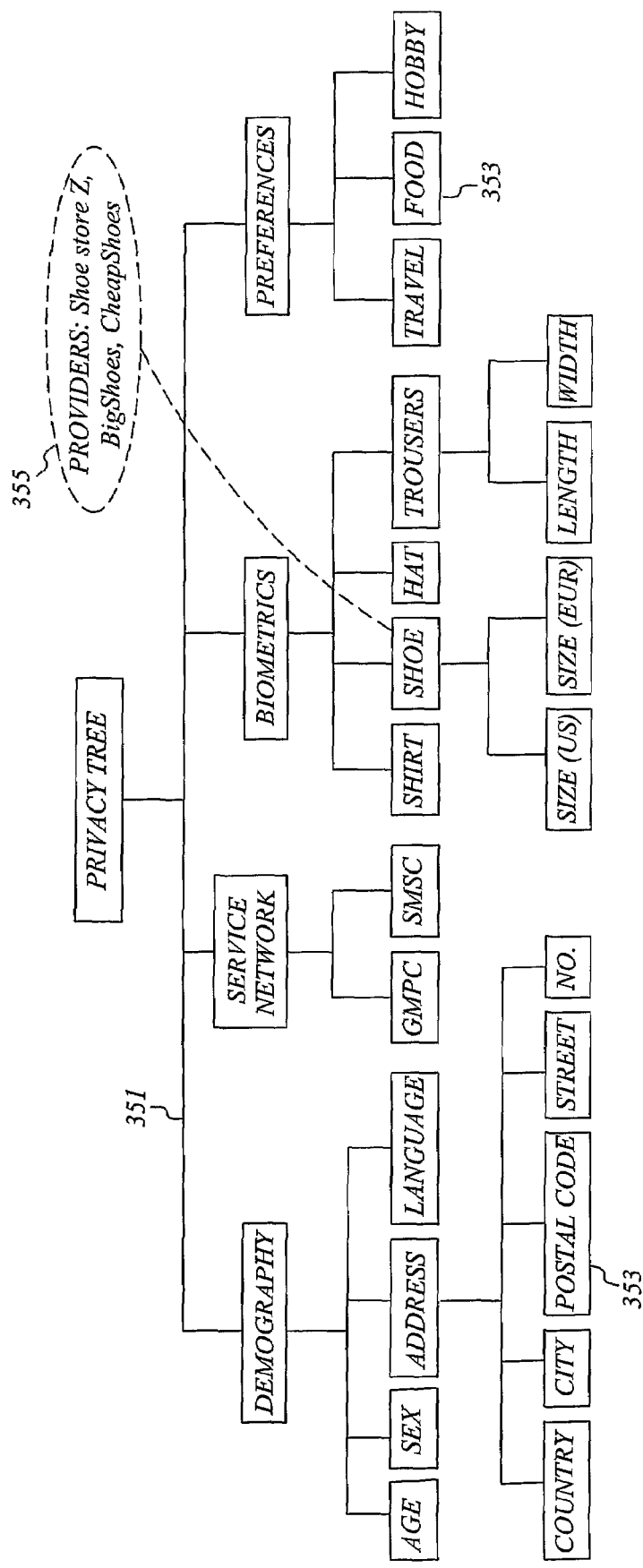
FIG. 3 illustrates a generic privacy tree used for arranging privacy policies in accordance with an example embodiment of the present invention.

There is preferably a generic privacy tree defined at system-level and by means of which user-specific individual privacy trees are created. FIG. 3 illustrates such a generic privacy tree 351 used for arranging privacy policies in accordance with an example embodiment of the present invention. The generic tree 351 shows what the different providers offer without making a connection to the respective end users. This tree is for a whole system and describes what information that is available to applications on the requesting side. Each node 353 contains or points at information 355 of the partners (e.g. companies named "Shoe store Z", "BigShoes", "Cheap-Shoes" for the shoe data element) that the service broker operator has signed agreements with, but this does not necessarily apply on the individual level. The nodes 353 may also for example contain relevant policy files/templates and pricing information, such as the cost/income of a request to one or more providers.

Figure 4:
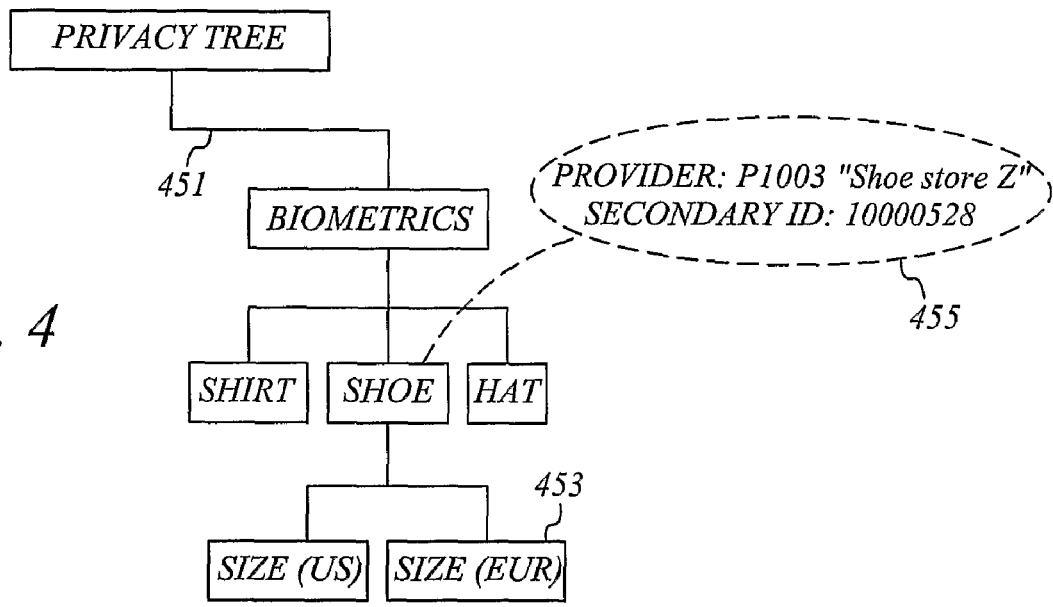
FIG. 4 illustrates an individual privacy tree used to store and access privacy policies in accordance with an example embodiment of the present invention.

Contrary to the generic privacy tree, the individual privacy trees are "pruned" according to rules defined by the respective end users. FIG. 4 illustrates such an individual privacy tree 451 used to store and access privacy policies in accordance with an example embodiment of the present invention. Information 455 about particular preferences including the allowed provider(s) for this particular individual is stored in the respective nodes 453. In this example, "missing" nodes (as compared to the generic privacy tree of FIG. 3) means that the corresponding services are not allowed by this individual. The end user of FIG. 4 has chosen "Shoe store Z" as provider for the shoe element, i.e. this end user allows the company "Shoe store Z" to provide personal data related to shoes to at least a subset of the persons allowed to retrieve personal data related to him.

The individual privacy trees 451 of the respective end users can with advantage be created by making a copy from the generic privacy tree 351. When this step is conducted, every node 453 is preferably set to "Not allowed to release data" until a privacy policy has been properly set for the node.

The hierarchy of the (generic and individual) privacy tree implies several advantages. It organizes the data in a user-friendly manner, providing an easy overview over many data types. Large quantities of data can be handled in a convenient manner. It would even be possible to have the privacy policies distributed in the service broker system, whereby the nodes of the privacy tree contain pointers to the respective privacy policies instead of the actual privacy data. Moreover, the hierarchically arrangement enables solutions where a permission on one level also is allowed to affect levels below, e.g. where the lower-level nodes contain data from the same provider.

Primary and Secondary Users

The personal data handling of the present invention can be further enhanced by making distinctions between different types of end users in accordance with a particular embodiment of the invention. Such a solution assigns a first user type, here referred to as primary user, to users that have privacy policies in the service broker and a second user type, here referred to as secondary user, to users that may merely request personal information about one or several primary users. Primary users are the ones that the requests for personal data relate to, requests originating from a primary or secondary end user. A primary user may thus be involved in a request ("asked about"), whereas a secondary user may ask about one or several primary users that have allowed him to do so but may not be asked about since he has no privacy policies defined. Typical secondary end users can be the family members, friends or colleagues of a particular primary end user.

In the case with secondary end users, the PSN preferably assigns at least one secondary end user to the primary end user in accordance with instructions communicated to the PSN (via the application unit) from the primary end user. This is typically performed in connection with the procedure of privacy policy setting. There may be cases where a user assigned as secondary to a particular primary user is automatically allowed to access all personal data related to that primary user. Typically, the primary user would have to specify which data elements he allows the specific secondary user to access, though. In FIG. 4, for example, access to the shoe data element has only been allowed to the secondary user with ID 10000528.

The service broker preferably issues unique identifiers for the involved primary and secondary users and distinguishes between these user types. As will be evident in the following, the procedure of handling a request for personal data with the proposed service broker system and privacy tree structure is made very effective due to the primary and secondary user IDs. It is for example possible to check that request comes from an allowed user at an early stage using look-up tables with definitions of the respective user relationships.

Requests for personal data related to a primary user can thus originate from the primary user himself or from another user that he has defined as secondary. It should be noted that it often can be the case that a primary user may ask about one or more other primary users and in this respect takes the role of "secondary user" towards these primary users. In other words, every primary user is also a potential secondary user.

Daemon Node

The user-friendliness and performance of the proposed mechanism for handling personal data can, in accordance with a particular embodiment of the invention, be further increased by introducing one or more so-called "daemon node" to the privacy trees. A daemon node is a node pointing at least two other nodes with respective personal data elements, by means of which aggregated requests are possible. The daemon node is associated with a unique service identifier, which means that it, as far as the requesting application is concerned, looks no different than any other service/node.

Figure 5:
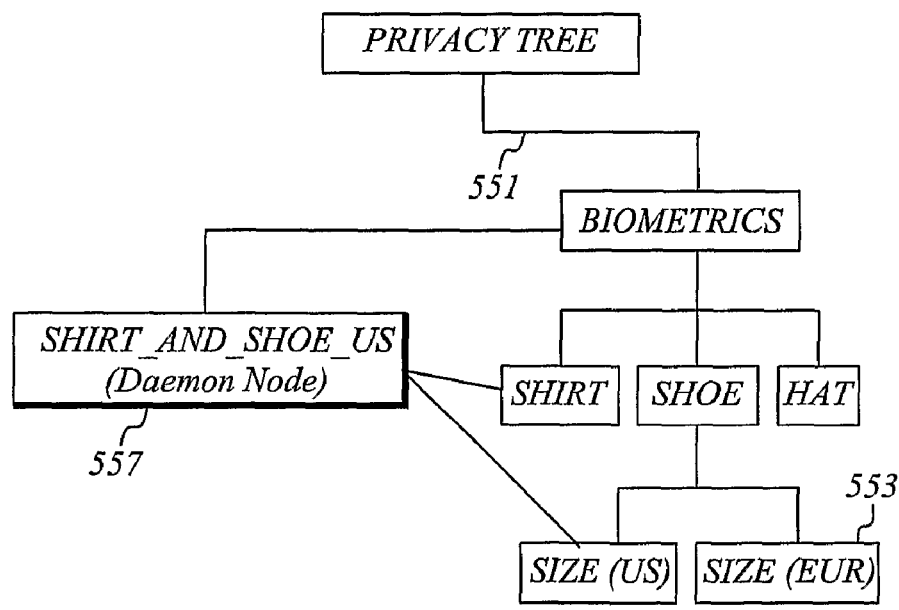
FIG. 5 illustrates a privacy tree with a daemon node in accordance with an example embodiment of the present invention.

FIG. 5 illustrates a privacy tree 551 with a daemon node 557 in accordance with an example embodiment of the present invention. The tree 551 of FIG. 5 can either represent a subset of a generic privacy tree or an individual privacy tree. The illustrated daemon node 557 points at the shirt node as well as the node for US shoe size. It is treated as any other node and allows for aggregated requests asking for both the shirt size and the US shoe size of a particular person (primary user). The shirt and shoe size data may not even be provided by the same data providers. With the daemon node, the access means of the requesting side can support the requester in just having one request, although there actually are multiple requests for respective data elements from the access means of the requesting side to access means of the providing side. As illustrated in FIG. 5, one advantageous feature of the daemon node 557 is that is can point at data nodes 553 arranged at different levels in the privacy tree 551. The daemon node may also very well point at nodes, at the same level or different levels, that belong to different sub-trees of the privacy tree.

The solution with daemon nodes thus enables reading of multiple personal data entities through one single request from the end user. The request communicated from the application unit to the service broker then comprises an aggregated request with a service identifier of a daemon node pointing at the multiple nodes in the privacy tree with their respective personal data elements. However, there may also be embodiments where the primary end user is allowed to set multiple data elements at the same time using the daemon node. In other words, the daemon node can also be used for aggregated writing of data, whereby privacy policies are simultaneously defined for multiple personal data elements.

By allowing aggregated requests for multiple pieces of information, the solution with daemon nodes speeds up the procedure of accessing the personal data elements (nodes) of the privacy tree. It makes it possible to form groups of suitable data elements, such as data elements that typically are used in the same service or data elements that have the same provider, which can be handled together by means of daemon nodes. Another benefit of the daemon node is that new services can be launched very quickly since new services can make use of existing services. For example, a service offering position to an application can easily be extended to include position and home city.

As mentioned, every daemon node is associated with a respective service ID and looks just like an "ordinary" service to a requesting application. However, the result of a request for personal data in a daemon node would result in a response message comprising multiple privacy policy files (or validation results, see below). Therefore, the access means of the application unit needs to split the request into multiple requests (one per "real" data element node) to the providing side. Furthermore, in case the request validation for example is performed at the requesting side, the application unit performs one validation for every node that the daemon node points at. The access means of the application unit has to aggregate the responses from the different providing units to one single response to be returned to the application node and also determine the outcome of the different validation events.

A particular issue in connection with daemon nodes is how to handle cases where a subset of the requests is successfully validated, whereas another subset is not. Should the allowed personal data be returned to the application node although it only constitutes a subset the requested data elements? In a particular embodiment of the invention, this is solved by letting the application node notify the access means at the application side of its needs, i.e. whether the service needs the entire set of data or whether a subset of also makes sense. This information may be included in the original request or be provided later upon invitation from the access means. For example, for a service that offers shoes with home delivery getting the shoe size but not the home address would not be of any good, whereas there may be other applications where the service can be carried out (although perhaps with less value) without all data items.

Example Procedure for Setting Data

An example procedure will now be described to illustrate how the privacy-setting node supports a convenient way for the end-user to define his privacy policies. The setting of privacy policies at the service broker can be performed either on pure initiative from the user, or following a request from the user for a service requiring personal data for which no policy has been set. In the latter case, a question is sent from the system asking the user if he would like to define a policy.

Theoretically, there can be an enormous amount of data to define, and the PSN preferably accomplishes this through the following end-user interactions:

A) The (primary) end user selects a data element (e.g. home address, position, or shoe size) that will have a policy defined. This step can for example involve stepping down a hierarchy, e.g. Biometrics→Shoe size→Shoe size in US sizes, in a privacy tree structure like the one illustrated in FIG. 3. By being organized logically and to provide an easy overview, the hierarchy makes it easy for the end-user to quick find the particular data element he is looking for. It can also facilitate the data setting further through one or several daemon nodes and/or features implying that a permission on one level also affect levels below (where this makes sense from the content or provider perspective).

B) Next, the end user defines allowed/possible provider(s) for the selected data element and this information is provided to the PSN via the application unit. The PSN can for example provide a list of data providers having agreements with the service broker from which the end user can select one or several providers. A particular data element can hence be associated with one or multiple possible data providers. The user may for example allow geographical position to be provided by the operator alone but home address to be provided by any of several providers.

C) Through further interaction between the service broker and the end user, the end user enters the required credentials, e.g. digital ID and password, for each selected provider. The service broker needs these credentials to prove to the selected provider that the service broker validly represents the person it claims to represent, whereby the provider can certify that he is authorized to release personal data related to that person.

D) In a preferred embodiment, when the above is completed, secondary users are defined, and possibly associated with passwords. As mentioned, a secondary user is allowed to fetch personal data related to the primary user. This will for example allow family members to make certain requests regarding each other. Secondary users can be defined separately (and thus perhaps differently) for different data elements or alternatively, through an "on/off"-option, i.e. every persons assigned as secondary user to a particular primary user is allowed to access all kinds of personal data on that person.

E) The PSN stores the policy/policies set by the primary user at appropriate positions in an individual privacy tree of this particular user. If this is the first data setting of the user, an individual privacy tree is first created, preferably by making a copy of (or some kind of linking to) the generic privacy tree of the service broker. The privacy policies can be stored together with their respective data elements or be stored separately and linked to their respective data elements through pointers, for example.

Example Procedure for Request Handling

An example procedure will now be described, with reference to FIG. 2 and a number of example look-up tables, to illustrate the functionality of the privacy-setting node in response to an incoming request for personal data. The major flows of sequences are in FIG. 2 indicated by arrows I-VII.

An end user (with user equipment 210) that wants a particular service accesses the application node 222 of the application unit 220 (I). Hereby, there is preferably a redirection to a common sign-on (CSO) server 256, by means of which the user logs into the service broker 250 (II). The interactions between the CSO mechanism and the service broker 250/PSN 258 are further described below in the section "Common sign-on implementation".

The request originating from the end user is communicated from the application node 222 in the application unit 220, via its access means 224, and to the service broker 250 with the PSN 258 (III, IV). The request includes an identifier of the primary user to which the requested personal data relates, e.g. MS-ISDN, credit card number or a similar identification means, and also an identifier of the requested service, e.g. a service sequence number for a regular node or a daemon node. The PSN 258 verifies the request according to the system specifications, e.g. using PKI and/or IP address data, to ensure that it comes from a legitimate client (access means). For this, a look-up table like Table 1 may for instance be used. Table 1 lists the partners connected to the service broker system and "out-of-band" data used to communicate with these partners. (The first column contains the ID of the respective partners at the service broker.) Examples of such out-of-band data are PKI data, the IP address, specifications of where to enforce privacy policies (e.g. as "default", specified on a system-wide basis, or specific for the application side and/or the providing side), response times (for partners on the providing side), how long the session may stay open, etc. The amount of out of band data is determined by the desired system functionality. As illustrated by Table 1, a partner-related out-of-band data table used in accordance with the present invention preferably does not make any difference between partners on the requesting side (the application unit in FIG. 2) or the providing side.

MS-ISDN or credit card number) to an internal, unique user ID for the service broker system using Table 2.

The information in Table 2 is used to map digital identities from one domain to another. The domains can for example be operator domains, such as the MS_ISDN domain, or business domains with customer identities (airline companies, shops, insurance companies, banks, etc.). As illustrated by the table, the digital identity is preferably independent of whether the partner belongs to the requesting side (the application unit) or the providing side. In case a partner would like different digital identities for the user/customer depending on if it is the primary user himself that asks for personal data or if someone else (a secondary user) is asking, this will in this example be handled by registering the partner twice with two different partner ID keys.

TABLE 1

| Partner ID key | Name of partner | Public key | IP address | Policy enforcement | Max response time | Time to live |
|---|---|---|---|---|---|---|
| P1001 | Big Sale store X | asdeiamk | 121.31.23.1 | default | 25 | 234 |
| P1002 | Food store Y | ppkdjej3s | 147.33.15.3 | A, B | 30 | 100 |
| ... | | | | | | |

In a preferred embodiment, the request verification with regard to partner starts with checking the IP address. If the request comes from an IP address that does not correspond to the address of Table 1, the request can be refused immediately. For a correct IP address, an optional next step can be to perform secondary checks of the digital signature (public key) and/or provider identity. Such a solution with a first independent check of the IP address contributes to a high system performance.

It should be mentioned that there at least theoretically might be situations where all parties are trusted and in such cases there is no need for an initial verification of this kind.

If the request was redirected to the CSO, the session ID received from the application node can be used to connect to the correct sessions started in the CSO login procedure. For a request that is not going via the CSO, there is no such session and an internal service broker ID has to be provided otherwise. In such a case, the PSN (or another functional unit of the service broker) maps the incoming primary user ID (e.g.

TABLE 2

| Partner ID key | Name of partner | ID type | User ID at partner | Password | User ID at service broker |
|---|---|---|---|---|---|
| P1001 | BigSale store X | customer no. | 736 284-1343 | dog4u | 10000100 |
| P1002 | Food store Y | credit card no. | 9332 4536 1954 | 321 336 | 10000100 |
| P1003 | Shoe store Z | loyalty card no. | 4623 6282 | jaimsa | 10000100 |
| P1004 | Operator ABC | MS-ISDN | +46 70 267 0652 | — | 10000100 |
| P1005 | Company Q | PUID | (2 × 32 bits) | (decryption key) | 10000100 |

For simplicity, Table 2 only shows digital identities of one primary end user. This end user is in his relations with the respective partners identified through his phone number or another customer identity but has only one service broker user ID.

The service broker needs to have an ID for the requesting party, which in case the requesting party equals the primary end user was already provided in the previous step. However, in case the requesting party is a secondary end user, the ID also of the requesting party (the secondary ID, e.g. MS-ISDN) is mapped to an internal service broker ID, in this example by means of Table 3.

Table 3 keeps track of basic personal data needed for the service broker to work properly and data on which parties that are allowed to ask for data about a particular user. In this example, the password of the "service broker pw"-column has double functionality: it can be used by the primary user to access his privacy settings and/or fetch personal data and it can optionally also be used by possible secondary users to fetch personal data about a primary user.

TABLE 3

| User ID at service broker | User name at service broker | Service broker pw | e-mail | Phone | Nickname | User type |
|---|---|---|---|---|---|---|
| 10000100 | my_name | ur2yys | me.u@mail.nu | +46 73 67 0652 | Me | P |
| 10000741 | wife | AbC123 | w@mail.nu | +1 234 5678 | Maria (wife) | P |
| 10000987 | LB_brother | Aspp43 | b@mail.nu | +1 234 5677 | Erik (brother) | P |
| 10000528 | LB_c1 | Es7m9 | c1@mail.nu | +1 234 5676 | Emelie (child) | S |
| 10000632 | LB_c2 | Lks22 | c2@mail.nu | +1 234 5675 | John (child) | S |
| 10000101 | I_love_LB | Cul8er | u.me@mail.nu | +46 8 404 5912 | Me | P |
| 10000337 | LB_wife2 | dfgd54 | e@mail.nu | +1 234 5674 | Eva (wife) | S |

The purpose of the user type column is to distinguish between primary users (P) that have privacy policies in the service broker and may be involved in a request (ask or be asked about) and secondary users (S) that may ask about primary users but for which no privacy policies have been defined, whereby data requests related to them are not allowed.

In a preferred embodiment, the PSN performs a minor check of the request already at this stage. If the request concerns a user that is only secondary, this can be seen from Table 3. Such a request can be terminated instantly and there is no need to compile a DTD (Document Type Definition), i.e. privacy policy, and return to the application node (compare the subsequent paragraphs). It is also possible to extend this checking event further in a way that will be described below in connection with Table 6.

After providing the proper user ID(s), the PSN retrieves the location of the individual privacy tree of the primary user as well as the location in the (generic) privacy tree of the node associated with the requested data from appropriate look-up tables. In this example, Table 4 is used to find the individual privacy tree. Given the service broker user ID, previously collected from Table 2, Table 4 points to the location of the individual privacy tree.

TABLE 4

| User ID at service broker | Pointer to individual privacy tree |
|---|---|
| 10000100 | privacy tree_groupA_tree0013 |
| 10000101 | privacy tree_groupA_tree0028 |
| 10000102 | privacy tree_groupB_tree0005 |
| ... | ... |

The path in the privacy tree can be determined by means of Table 5, to which the service ID incoming with the request is input. Given the service ID from the requesting party, this table describes where in the generic privacy tree as well as in the individual privacy tree the relevant privacy policy should be found. The pointer is preferably "relative" in the sense that it tells how to step down in the tree using a name space schema. The pointers can point at real ("single") nodes, like service 005-008 in the example, or at daemon nodes, like service 009.

TABLE 5

| Service ID | Pointer within privacy tree |
|---|---|
| 005 | biometrics.shoe.size_(EUR) |
| 006 | service_network.GMPC |
| 007 | demography.address.city |
| 008 | biometrics.shoe_all |
| 009 | biometrics.shirt_and_shoe_US |
| ... | ... |

The pointers from Table 4 and Table 5 are sufficient to collect the individual privacy tree and identify the correct data element/node in the privacy tree. After doing this, the PSN preferably checks the request with regard to the requesting end user and requested data element as follows.

Table 6 keeps track of how the service broker identities are related to each other. For requests originating from a different person than the primary user, it can be used by the PSN to see if the request is allowed with regard to the relationship between the end users. More specifically, Table 6 defines associations between the respective primary user IDs and one or more IDs for secondary users that have been allowed by the primary user to ask about personal data related to him. If a password is required, this is retrieved from Table 3. To help intuitive grouping user interactions, the example Table 6 allows a type of nickname for groups, for example "family" or "colleague". This enables privacy policies to be set together for entire groups of secondary IDs.

TABLE 6

| Relationship ID | Primary user ID | Secondary user ID | Displayed secondary ID |
|---|---|---|---|
| R001 | 10000100 | 10000741 | Family |
| R002 | 10000100 | 10000987 | Family |
| R003 | 10000100 | 10000528 | Family |
| R004 | 10000100 | 10000632 | Family |
| R005 | 10000102 | 10000365 | Colleague |
| R006 | 10000102 | 10000113 | Colleague |
| R007 | 10000103 | 10000994 | Manager |

By means of Table 6 the PSN can check that the requesting end user is a valid secondary user for the primary user that the request concerns. If this is the case, the procedure continues. On the other hand, should the requesting end user not be a valid secondary user the procedure is terminated. This check may in some embodiments be performed even before retrieving the individual privacy tree, e.g. in connection with the above-described minor check using Table 3.

However, normally the requesting user will need to be checked more specifically, in relation to the particular requested data element. The individual privacy tree is retrieved through interactions between the PSN 258 and the database 254 holding the privacy tree (V in FIG. 2). The output from the look-up in Table 5 is then used by the PSN to find the right node in the individual privacy tree. Thereafter, it is ensured that the requesting user is allowed to ask about this particular data element. The PSN then checks if there is a privacy policy defined for this particular data element. If not, the flow stops and access means and applications are notified.

If, on the other hand, the requested type of data may be allowed, i.e. has a privacy policy, a suitable provider 240 to take on the incoming request is determined by the PSN 258. The provider is preferably selected from a list in the generic privacy tree of the provider(s) that have agreements with the service broker system. (The interactions between the data providing unit and the service broker to establish an agreement that supports listing of the provider in the generic privacy tree are not indicated in FIG. 2.) If there are more that one possible provider defined for the requested data element, the PSN preferably selects provider using system-wide business logic, for example based on at least one of the following factors: end user preferences, operator preferences, and user behavior.

When the provider has been selected, the data, which will be sent to the application unit/requesting side 220 so that it can access data at the selected providing unit 240, is extracted from the appropriate look-up tables. Out of band data for the selected partner at the providing side is extracted from Table 1. A minimum requirement is that the access means 224 is provided with the IP address of the provider or some corresponding information that enables accessing the providing unit, either directly or via one or more intermediate devices.

Table 2 is used to find user credentials to be used on the providing side. In this example, the internal service broker ID of the primary user that the request concerns is input to the table together with an identifier of the selected data provider, whereby a user ID and, optionally, password valid at the providing side can be determined.

The collected out of band data and user credentials related to the selected provider are returned to the application unit (IV), preferably in a message also containing the privacy policy that was retrieved from the privacy tree of the primary user as described above. The request is preferably validated at the application unit or at the providing unit. This means that content of the request is compared to content of the privacy policy to see if the requested personal data may be handed out to the requester. Provided that the request is successful, the application unit retrieves the requested personal data from the providing unit that it has been referred to (VI, VII).

In a preferred embodiment, the return message is created using predefined templates retrieved by the PSN. There may for example be a DTD template comprising the user-defined policy file that is incorporated into a SOAP response message in the following manner. An identifier of the selected providing unit is together with the service ID from the incoming request used to look up templates for the DTD and the SOAP response. Thereafter, the message content comprising the out of band data for the provider, the user ID on the providing side and the DTD template (privacy policy template) is aggregated into the SOAP template to form SOAP response. The message sent from the service broker to the application unit and then to the providing unit (unless a validation at the application unit prohibits this) can with advantage be of the encapsulated type described in [2].

As for the case with a request pointing at a daemon node, the daemon node has an associated unique service ID and thus normally also an associated response template, such as a template for a SOAP response. The response typically includes one DTD for every node accessed via the daemon node. An alternative to DTD, for single requests as well as for aggregated requests by means of the daemon node, is to use XML schema. Such an embodiment and other implementations of the privacy policy files and response messages also lie within the scope of the invention.

Of course, encryption and digital signing should be applied to the messages sent in accordance with the present invention. For this, conventional encrypting means can be used, see for instance [1] and [2].

In the described examples, the final request validation is performed either at the application unit or at the providing unit or both. It is to be understood that a less preferred but still possible alternative would be to perform the validation already at the service broker. In such a case, it is not necessary to return the privacy policy to the application unit if the validation outcome is communicated to the application unit in another way.

The present invention is very applicable for example to cases where the request communicated to the service broker is a request for a web service, information on which is published at the service broker and a description on which is stored in association with the service broker. For more details on such web service implementations, reference is made to [2].

Common Sign-on Implementation

As mentioned above, a user about to request a service/access personal data through the service broker system of the present invention is preferably redirected to a common sign-on (CSO) server (flow arrow II in FIG. 2), by means of which the user then logs in at the service broker. With the CSO mechanism user authentication is performed every time a new application is contacted. A digital user identity restricted to the service broker is issued.

In a preferred embodiment the CSO server is arranged at the service broker to communicate with the PSN, whereby it can alert the PSN of an expected request at an early stage, resulting in an improved system performance. When the end user logs in via the CSO, the PSN shall fetch the individual privacy tree of the end user and create a session for him. A (temporary) session ID is preferably generated and returned from the CSO. Then, the PSN server generally goes into a waiting state until the service request is received from the access means of the application unit.

For a request procedure of the kind initiated via the CSO, the PSN would verify that a session exists upon receiving a request for personal data. If the CSO procedure is to be used and there is no session, the process is interrupted.

For more details on the CSO functionality, reference is made to [2].

Figure 6:
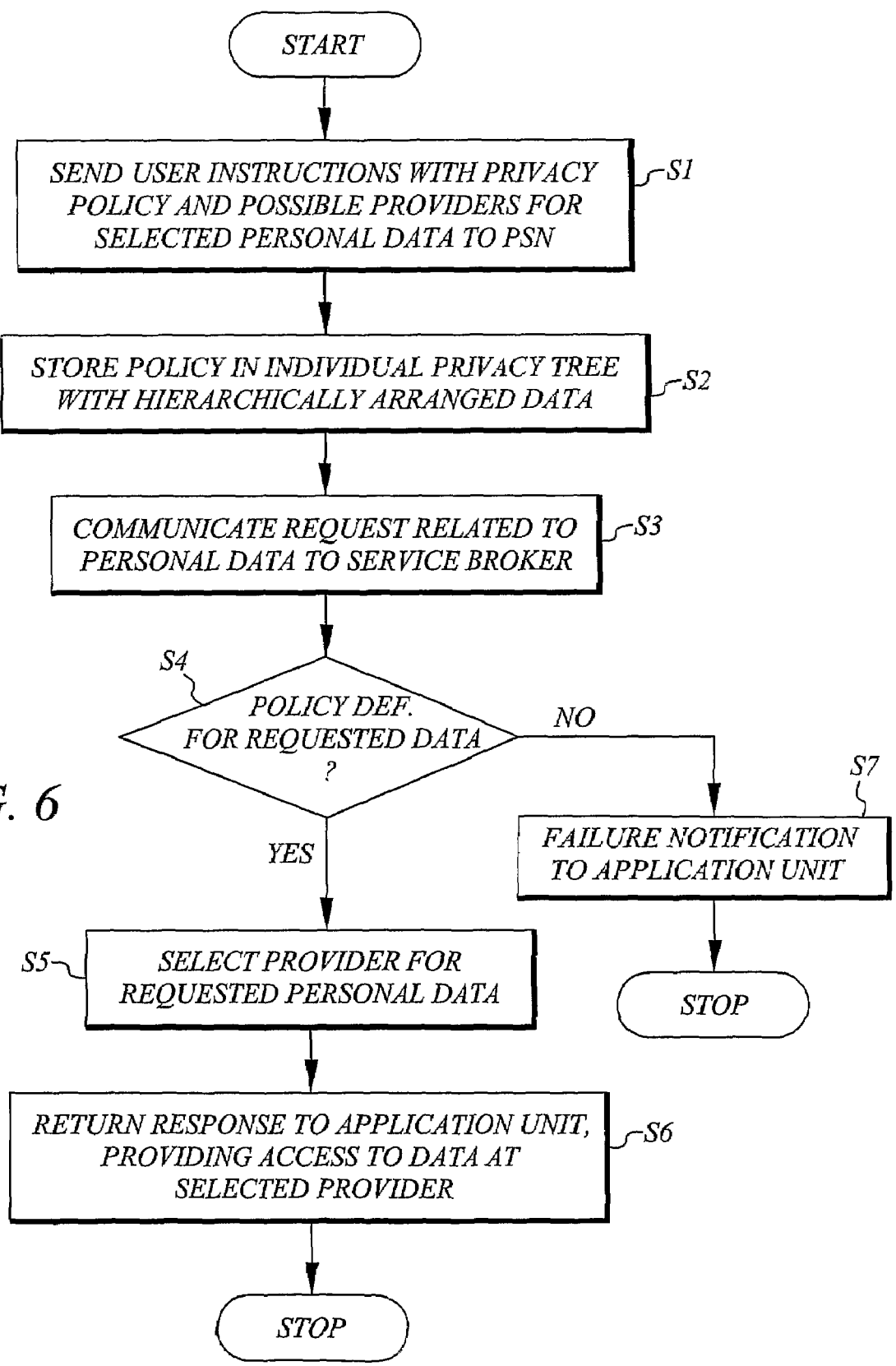
FIG. 6 is a flow chart of a method for end user controlled handling of personal data in accordance with an example embodiment of the present invention.

FIG. 6 is a flow chart summarizing a procedure for end user controlled handling of personal data in accordance with an example embodiment of the present invention. The procedure starts with setting policies for personal data at the broker. In a first step S1, instructions originating from a primary end user and defining a privacy policy for a selected personal data element are communicated, via an application unit, to a privacy-setting node of the service broker. The instructions define at least one possible data providing unit for the selected personal data element. The privacy policy is stored in an individual privacy tree for the primary end user comprising hierarchically arranged personal data elements with associated privacy policies (step S2).

As mentioned, the setting of privacy policies at the broker (steps S1, S2) can be performed either on pure initiative from the user, or after redirection to the service broker when the user has made a service request involving personal data related to himself.

The pull/push procedure starting when an application node requests a particular service is outlined in steps S3-S7. A request related to at least one personal data element is communicated from the application unit to the service broker in step S3. The request comprises an identifier of the primary end user to which the requested personal data element(s) relate and a service identifier. A (valid) request originates either from the primary end user or from a secondary end user defined by the primary end user.

The privacy-setting node determines whether there is a privacy policy defined by the primary end user for the respective requested personal data element(s) by checking the individual privacy tree of the primary end user. Step S4 asks whether there is a privacy policy defined for any of the requested personal data element(s). If so, the privacy-setting node selects a data providing unit among the possible data providing unit(s) for each of these personal data element(s) in step S5. The privacy-setting node returns a response message to the application unit, providing access to the requested personal data element(s) at the selected data providing unit(s) in a final step S6. If, on the other hand, there is no privacy policy for the requested personal data, the procedure takes another path and terminates, preferably after returning a notification of the request refusal to the application unit in an optional step S7. In case the requester is the primary user, the notification may be accompanied by a question asking the user if he would like to define a policy, which may result in a redirection to the above-described data setting procedure and step S1.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

REFERENCES

[1] International Patent Application publ. WO 03/032222 A1, Telefonaktiebolaget L M Ericsson, April 2003.
[2] International Patent Application publ. WO 2004/072885 A1, Telefonaktiebolaget L M Ericsson, August 2004.

The invention claimed is:

1. A method for end user controlled handling of personal data in a communication system including an application unit arranged to communicate with a service broker and a number of data providing units, comprising the steps of:
receiving, at a privacy-setting node of the service broker, instructions originating from a primary end user defining a privacy policy for a selected personal data element, including instructions associating at least one possible data providing unit with the selected personal data element;
storing the privacy policy in an individual privacy tree for the primary end user in association with the privacy-setting node and comprising hierarchically arranged nodes for personal data elements with associated privacy policies;
communicating a request related to at least one personal data element from the application unit to the service broker, said request comprising an identifier of the primary end user to which the requested personal data element(s) relate and a service identifier; and
determining, at the privacy-setting node, whether there is a privacy policy defined by the primary end user for the respective requested personal data element(s) by checking the individual privacy tree of the primary end user, and, if there is a privacy policy defined for at least a subset of the requested personal data element(s), further comprising the steps of:
selecting, at the privacy-setting node, a respective data providing unit among the possible data providing unit(s) for the requested personal data element(s) with the defined privacy policy; and
returning a response message from the privacy-setting node to the application unit, providing access to the requested personal data element(s) with the defined privacy policy at the selected data providing unit(s), wherein the communication system is an open network.

2. The method of claim 1, wherein said individual privacy tree is based on at least a portion of a generic privacy tree comprising hierarchically arranged nodes, at least a subset of which points at respective personal data elements for which privacy policies may be defined.

3. The method of claim 1, wherein the request communicated to the service broker is an aggregated request comprising a service identifier of a daemon node pointing at multiple nodes with respective personal data elements in the privacy tree.

4. The method of claim 3, wherein said daemon node points at nodes arranged at different levels or in different sub-trees of the privacy tree.

5. The method of claim 1, comprising the step of collecting the privacy policy using respective pointers to the individual privacy tree of the primary end user and to the node for the privacy policy in the hierarchical tree structure.

6. The method of claim 5, wherein the step of collecting the privacy policy involves at least one predefined look-up table, by means of which the pointer to the individual privacy tree is derived based on an identifier of the primary end user valid at the service broker, and the pointer to the node for the privacy policy is derived based on the service identifier.

7. The method of claim 1, comprising the step of assigning at least one secondary end user in accordance with further instructions from the primary end user, said secondary end user being allowed to access at least a subset of the personal data elements related to the primary end user.

8. The method of claim 7, comprising the steps of:
checking, at the privacy-setting node, the origin of the request from the application unit; and
refusing the request unless it origins from the primary end user of the requested personal data element or from a secondary end user assigned by the primary end user for the requested personal data element.

9. The method of claim 1, wherein the response message comprises a user identifier valid at the selected data providing unit and an IP address of the selected data providing unit.

10. The method of claim 9, wherein the response message further comprises a policy file with the privacy policy for the requested personal data element.

11. The method of claim 10, further comprising the step of verifying the request, at the application unit or at the selected data providing unit, by comparing the request to the privacy policy for the requested personal data element.

12. The method of claim 9, comprising the step of collecting the user identifier valid at the selected data providing unit and the IP address of the selected data providing unit from at least one look-up table using an identifier of the primary end user valid at the service broker and an identifier of the selected data providing unit as inputs.

13. The method of claim 1, further comprising the step of performing, at a common sign on (CSO) server, an end user authentication event for every request received at the application unit, the CSO server being arranged in the service broker to communicate with the privacy-setting node.

14. A communication node with means for end user controlled handling of personal data, said communication node being arranged at a service broker in a communication system further including an application unit arranged to communicate with the service broker and a number of data providing units, the communication node comprising:
means for receiving instructions originating from a primary end user defining a privacy policy for a selected personal data element, including instructions associating at least one possible data providing unit with the selected personal data element;

means for storing the privacy policy in an individual privacy tree for the primary end user, said individual privacy tree comprising hierarchically arranged nodes for personal data elements with associated privacy policies;

means for receiving a request related to at least one personal data element communicated from the application unit to the service broker, said request comprising an identifier of the primary end user to which the requested personal data element(s) relate and a service identifier;

means for determining whether there is a privacy policy defined by the primary end user for the respective requested personal data element(s) by checking the individual privacy tree of the primary end user;

means for selecting, if there is a privacy policy defined for at least a subset of the requested personal data element(s), a respective data providing unit among the possible data providing unit(s) for the requested personal data element(s) with the defined privacy policy; and means for returning a response message to the application unit, providing access to the requested personal data element(s) with the defined privacy policy at the selected data providing unit(s), wherein the communication system is an open network.

15. The communication node of claim 14, wherein said individual privacy tree is based on at least a portion of a generic privacy tree comprising hierarchically arranged nodes, at least a subset of which points at respective personal data elements for which privacy policies may be defined.

16. The communication node of claim 14, wherein said individual or generic privacy tree comprises at least one daemon node pointing at multiple nodes in the privacy tree, whereby multiple personal data elements can be reached through an aggregated request.

17. The communication node of claim 16, wherein said daemon node points at nodes arranged at different levels or in different sub-trees of the privacy tree.

18. The communication node of claim 14, comprising means for collecting the privacy policy through respective pointers to the individual privacy tree of the primary end user and to the node for the privacy policy in the hierarchical tree structure.

19. The communication node of claim 18, wherein the means for collecting the privacy policy involves at least one predefined look-up table, by means of which the pointer to the individual privacy tree is derived based on an identifier of the primary end user valid at the service broker, and the pointer to the node for the privacy policy is derived based on the service identifier.

20. The communication node of claim 14, comprising means for assigning at least one secondary end user in accordance with further instructions from the primary end user, said secondary end user being allowed to access at least a subset of the personal data elements related to the primary end user for the requested personal data element.

21. The communication node of claim 20, comprising:
means for checking the origin of the request from the application unit; and
means for refusing the request unless it origins from the primary end user of the requested personal data element or from a secondary end user assigned by the primary end user.

22. The communication node of claim 14, wherein the response message comprises a user identifier valid at the selected data providing unit and an IP address of the selected data providing unit.

23. The communication node of claim 22, wherein the response message further comprises a policy file with the privacy policy for the requested personal data element.

24. The communication node of claim 22, comprising means for collecting the user identifier valid at the selected data providing unit and the IP address of the selected data providing unit from at least one lookup table through an identifier of the primary end user valid at the service broker and an identifier of the selected data providing unit as inputs.

25. The communication node of claim 14, further comprising authentication means arranged to communicate with a CSO server in the service broker, such that there is an end user authentication event for every application request received at the application unit.

26. A communication system with means for end user controlled handling of personal data, comprising a communication node which comprises:

means for receiving instructions originating from a primary end user defining a privacy policy for a selected personal data element, including instructions associating at least one possible data providing unit with the selected personal data element;

means for storing the privacy policy in an individual privacy tree for the primary end user, said individual privacy tree comprising hierarchically arranged nodes for personal data elements with associated privacy policies;

means for receiving a request related to at least one personal data element communicated from the application unit to the service broker, said request comprising an identifier of the primary end user to which the requested personal data element(s) relate and a service identifier;

means for determining whether there is a privacy policy defined by the primary end user for the respective requested personal data element(s) by checking the individual privacy tree of the primary end user;

means for selecting, if there is a privacy policy defined for at least a subset of the requested personal data element(s), a respective data providing unit among the possible data providing unit(s) for the requested personal data element(s) with the defined privacy policy; and means for returning a response message to the application unit, providing access to the requested personal data element(s) with the defined privacy policy at the selected data providing unit(s), wherein the communication system is an open network.

* * * * *